May 1, 1956 — W. L. WELLS — 2,743,623
SCREW ACTUATORS
Filed Sept. 16, 1954
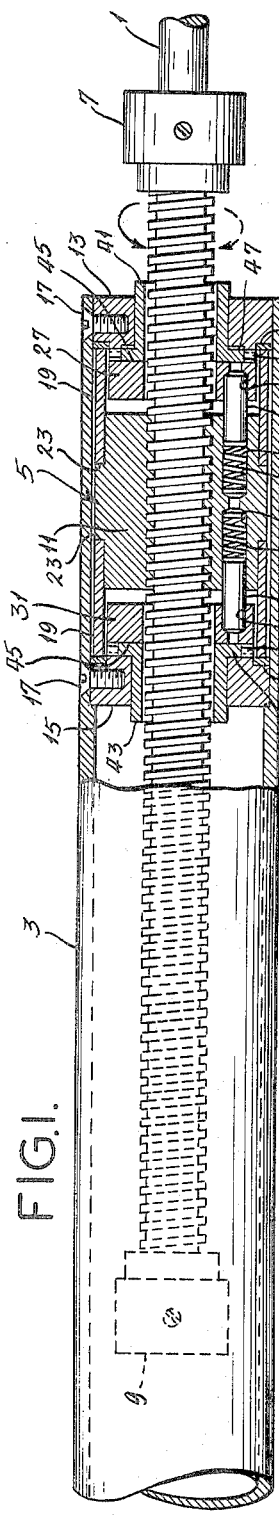
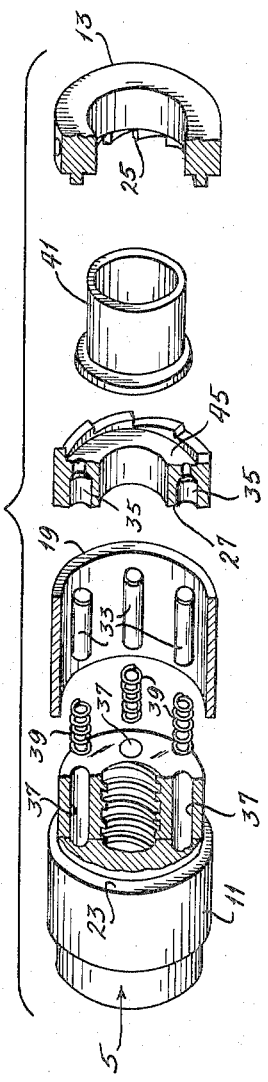
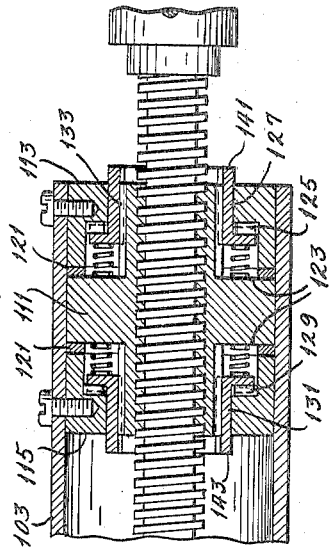
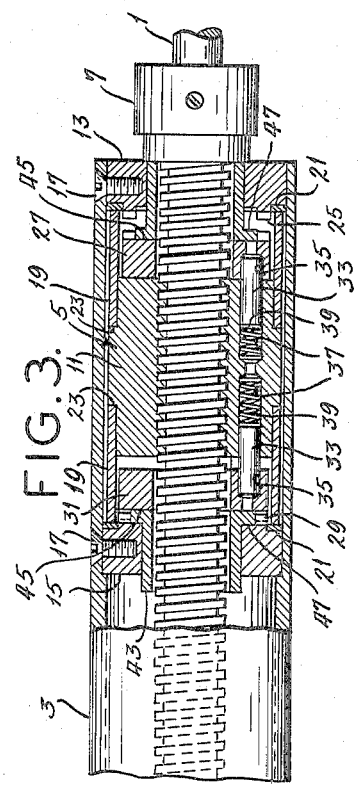
INVENTOR
WILLIS L. WELLS
By Brunings and Sutherland,
ATTORNEYS.

United States Patent Office 2,743,623
Patented May 1, 1956

2,743,623

SCREW ACTUATORS

Willis L. Wells, Clayton, Mo., assignor to Lambert Engineering Company, St. Louis, Mo., a corporation of Missouri Application September 16, 1954, Serial No. 456,554

5 Claims. (Cl. 74—424.8)

This invention relates to screw actuators, and more particularly to screw-driven apparatus wherein linear movement is maintained within predetermined limits.

A screw drive is frequently employed in jacks, valves and similar apparatus when large actuating forces or precise control over linear movement are desired. The screw provides considerable reduction of mechanical advantage in translating rotary power into rectilinear movement, but there is a disadvantage in that longitudinal travel of the elements can be controlled only by stopping the rotary driving means. For example, it is customary to use limit switches when the unit is driven by an electric motor, and, in the event of failure, the system is likely to jam, the jam being especially bad because of the inertia of the motor and the large reduction between the motor and the mechanically jammed parts. Also, control by limit switches may lead to variations in the stopping position as the friction within the system varies. For example, the lubricant of the system may stiffen in cold weather, with the result that the motor does not "coast" as much as it would under warmer conditions.

Accordingly, it is an object of the invention to provide an improved screw drive wherein rectilinear travel of the nut is controlled independently of the driving means for the screw. Among the several other objects of the invention may be noted the provision of a compact, inexpensive drive of the character referred to; the provision of a screw actuator having readily-set limit-of-movement controls; and the provision of a screw drive providing an auditory indication of having reached a limit-of-movement.

Briefly, these objectives are achieved using the usual screw and nut, but the nut is coupled to the driven structure through overrunning clutches, the clutches being automatically disengaged by contact with suitable stops fixed in the limit positions. More specifically, the nut is an assembly which includes a threaded body and an outer driven element, the threaded body being axially fixed and rotatably journaled in the driven element. The body is also contained between collars fixed to the driven element at the ends of the nut assembly. These collars are formed with inwardly-directed ratchet teeth, which teeth cooperate with ratchet elements disposed between the threaded body and the end collars. The ratchet elements are keyed to the threaded center part but are axially movable, springs being provided to bias them outwardly for engagement with the ratchet teeth of the fixed end collars. The axially-movable ratchet elements also have associated actuators which project axially from the assembly for engagement with the fixed stops, thereby to be disengaged as the nut assembly reaches a limit stop.

Other features of the invention will be in part apparent from and in part pointed out in the following detail description taken in connection with the accompanying drawings, in which:

Fig. 1 is a longitudinal section illustrating a screw-driving device embodying the invention;

Fig. 2 is an oblique exploded view of certain parts illustrated in Fig. 1;

Fig. 3 is a view similar to that of Fig. 1, but showing the nut assembly driven against one of its stops; and Fig. 4 is a view similar to that of Fig. 1, but showing an alternative embodiment of the invention.

Referring now to the drawings, there is shown a screw 1, which would be coupled to suitable driving means (not shown). For example, the screw might be connected at its right end (as viewed in Fig. 1) to an electric motor, either directly or through reducing gears. The driven part of the apparatus is represented by a tube 3, which would be mounted for non-rotary axial movement within guides (not shown). The driving screw 1 is then coupled to the driven element 3 by means of a nut assembly generally designated 5, which is secured within the driven tube 3 at one end thereof.

As the screw 1 is rotated in the direction indicated by the solid arrows, the nut assembly 5 and associated structure 3 is driven to the left as viewed in Fig. 1, movement in the reverse direction being indicated by dotted arrows. Travel to the right is limited by a part 7 fixed to that end of the screw, whereas the limit of movement to the left is determined by a part 9 affixed to the other end of the screw. It should be understood, however, that the limit-of-movement stops 7 and 9 might be mounted on other fixed structure, and that the driven element 3 need not be the particular tube-shaped element which is illustrated.

In Figs. 1–3, the nut assembly generally designated 5 is shown to comprise an internally-threaded body 11 and a pair of end-forming collars 13 and 15, the latter being secured, respectively, at the right and left ends of the assembly. Screws 17 are employed to lock the collars to the driven part 3 of the apparatus, but the body 11 is rotatably held between a pair of sleeve-like spacers 19. Washers 21 may be seated within the collars as thrust bearings for the spacers 19, the spacers otherwise being telescoped within the tube 3 and secured over the body against a shoulder 23. While the end collars are secured to the driven part against relative axial and rotary displacement, the body is secured only against axial displacement, and hence would be free to rotate with the screw 1 but for certain ratchet mechanism.

In particular, the collar 13 is shaped with ratchet teeth 25, which extend axially inward for cooperation with an axially-movable ratchet element 27, the teeth being shaped to prevent rotation of the element 27 relative to the collar 13 in the direction of the dotted arrow, while permitting relative rotation in the opposite direction. Similarly, the collar 15 has teeth 29, which cooperate with a second axially-movable ratchet element 31. The cooperating teeth of the parts 15 and 31, however, are designed to lock and release under rotary conditions opposite from those of parts 13 and 27.

The two ratchet elements 27 and 31, in turn, are keyed to the threaded body 11 by means of pins 33, which are seated axially in holes 35 spaced about the centers of the two elements. These pins extend into similar holes 37 within the body 11 and are biased outwardly by compression springs 39, thereby providing an outward bias for the ratchet elements. As such, the parts 13 and 27 constitute a first overrunning clutch, whereas the parts 15 and 31 form a second overrunning clutch. The clutches are effective only in opposite directions of rotation, however, hence the threaded body 11 is normally locked against rotation relative to the drive member 3 and the attached collars 13 and 15.

It is only when the driven element approaches its limits of travel that the clutches become ineffective. This is accomplished by means of clutch-actuating sleeves 41 and 43, the sleeve 41 being received within the collar 13 for relative axial movement and the sleeve 43 being slidably contained by the collar 15. It will be noted that the teeth 25 and 29 lie just inside the spacers 19, and those portions 45 of the ratchet elements 27 and 31 that lie adjacent the screw are smooth-faced. The actuating sleeves 41 and 43 abut against the smooth faces 45, and retaining flanges 47 are formed on the actuating sleeves to engage behind the end collars 13 and 15. Otherwise, the actuating members 41 and 43 project axially beyond the collars 13 and 15, respectively, for engagement with the limit stops 7 and 9, respectively.

In operation, the screw 1 is rotated in the direction of the solid arrow to move the tube 3 to the left as viewed in Fig. 1. While the screw is so turned, the threaded body 11 is initially prevented from rotating with the screw by locking cooperation of the teeth 29 at the left end of the nut assembly. When the nut assembly approaches the stop 9, however, the left actuating sleeve 43 engages the stop, with the result that the sleeve 43 moves axially inward relative to the collar 15. As the actuating sleeve 43 is moved inward, the left ratchet element 31 is driven back clear of the teeth 29. The threaded body is then free to rotate with the screw relative to driven part 3, so that the nut assembly ceases travel to the left.

As the body 11 rotates, the right ratchet element 27 has an overrunning action with respect to the teeth 25 of the right collar, the element being intermittently pushed inwardly as it rides over the incline of the teeth 25 in the direction of the solid arrow. This ratcheting action, in turn, produces a clicking sound, which serves as an auditory indication that the nut assembly has reached its limit-of-movement to the left.

When the screw is rotated in the opposite direction, as indicated by the dotted arrows, the right ratchet element 27 locks with the teeth 25, and the threaded body is again locked to the tube 3. While so locked, the nut assembly and tube 3 are driven to the right while the screw is turned in the direction of the dotted arrow. Eventually, however, the right actuating element 41 is driven up against the limit-of-movement stop 7 at the right, with the result that the ratchet element 27 is disengaged from the teeth 25 and the body 11 is released to rotate with the screw. In this instance, the parts 15 and 31 overrun and provide an auditory signal of the nut assembly having reached its limit-of-movement to the right.

From the foregoing, it will be apparent that the device illustrated in Figs. 1–3 accomplishes the objects of the invention, but it should be understood various modifications will suggest themselves to those skilled in the art. For example, referring to Fig. 4 of the drawings, there is shown a somewhat different arrangement. In this instance, the threaded body 111 has shoulders 123, which project outwardly a substantial distance. In place of the pins 33, the body may have a splined cooperation 133 with ratchet elements 127 and 131. The ratchet elements 127 and 131 project axially at 141 and 143 beyond the body 111 for actuating cooperation with limit stops, and they have teeth which cooperate at 125 and 129, respectively, with end collar 113 and 115. The latter parts 113 and 115 are secured to a tube 103, the shoulder 123 of the body being sandwiched therebetween by washers 121. Otherwise, the device of Fig. 4 operates in the same manner as that shown in Figs. 1–3.

It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In a screw drive having a rotary screw, an axially-movable driven element and a stop limiting travel of the driven element; a nut assembly comprising an internally-threaded body cooperable with said screw, said body being axially fixed and rotatably journaled relative to said driven element, a pair of cooperating ratchet elements keyed respectively to said driven element and said body, spring means normally biasing said ratchet elements into driving engagement with one another, and actuating means carried by said nut assembly for engagement with said limit stop, said actuating means being coupled to separate said ratchet elements free of driving engagement with one another upon engagement of said actuating means with said limit stop.

2. In a screw drive having a rotary screw and an axially-movable non-rotary driven element, a nut assembly comprising an internally-threaded body cooperable with said screw, a pair of overrunning clutches coupling said body to said driven element, said clutches having an overrunning action in opposite directions of rotation, stops limiting the travel of said driven element, and actuating means carried by said nut assembly for engagement with said limit stops, said actuating means being coupled to open said clutches upon engagement with said limit stops.

3. A screw drive comprising a rotary screw, a non-rotary axially-movable driven element, a pair of stops limiting axial movement of said driven element, an internally-threaded body cooperable with said screw, a pair of oppositely-effective overrunning clutches rotatably coupling said body to said driven element, said first clutches locking said body to said driven element when the screw is rotated in one direction to move the driven element toward said first limit stop, said second clutch locking said body to said driven element when the screw is rotated in the opposite direction to move the driven element toward said second limit stop, a first actuator for opening said first clutch upon engagement with one of said limit stops, and a second actuator for opening said second clutch upon engagement with said other limit stop.

4. In a screw drive having a rotary screw, and an axially-movable non-rotary driven element, a nut assembly comprising an internally-threaded body cooperable with said screw, said body being axially fixed and rotatably journaled relative to said driven element, a first pair of cooperating ratchet elements keyed respectively to said driven element and said body, a second pair of cooperating ratchet elements keyed respectively to said driven element and said body, spring means normally biasing each set of ratchet elements into driving engagement with one another, said first pair of ratchet elements having an overrunning action in one direction of rotation and said second pair of ratchet elements having an overrunning action in the opposite direction of rotation, a pair of stops limiting travel of said driven element, and a pair of actuators carried by said nut assembly for engagement with said limit stops, one of said actuators being mounted to separate said first pair of ratchet elements upon engagement with one of said limit stops and said second actuator being mounted to open said second pair of ratchet elements upon engagement with said other limit stop.

5. In a screw drive having a rotary screw and an axially-movable non-rotary driven element, a nut assembly comprising an internally-threaded cylindric body cooperable with said screw, said body being rotatably received within said driven element, a pair of collars secured to said driven element on opposite sides of said body and in spaced relationship therewith, spacer sleeves extending between said body and said collars to hold said body against axial movement relative to said driven element, each of said collars being formed with teeth projecting axially inward, a pair of ratchet elements disposed between said body and said collars for cooperation with said teeth, each of said ratchet elements being keyed against rotation relative to said body, spring means biasing said ratchet elements outwardly from said body into engagement with the teeth of said collars, and actuating sleeves projecting axially from said ratchet elements through said collars for engagement with limit stops.

References Cited in the file of this patent
UNITED STATES PATENTS
2,398,841    Morris _____ Apr. 23, 1946